United States Patent
Suh et al.

(10) Patent No.: US 10,036,922 B2
(45) Date of Patent: *Jul. 31, 2018

(54) LIQUID-CRYSTAL DISPLAY DEVICE

(71) Applicant: Samsung Display Co. Ltd., Yongin-si (KR)

(72) Inventors: Duck Jong Suh, Gwangmyeong-si (KR); Su Jeong Kim, Uiwang-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/371,778

(22) Filed: Dec. 7, 2016

(65) Prior Publication Data

US 2017/0205667 A1    Jul. 20, 2017

(30) Foreign Application Priority Data

Jan. 19, 2016 (KR) .......................... 10-2016-0006281

(51) Int. Cl.
| | | |
|---|---|---|
| *G02F 1/1333* | (2006.01) | |
| *G02F 1/1337* | (2006.01) | |
| *G02F 1/1335* | (2006.01) | |
| *G02F 1/1343* | (2006.01) | |
| *G02F 1/1368* | (2006.01) | |
| *G02F 1/137* | (2006.01) | |
| *G02F 1/1339* | (2006.01) | |

(52) U.S. Cl.
CPC ........ *G02F 1/133711* (2013.01); *G02F 1/137* (2013.01); *G02F 1/1368* (2013.01); *G02F 1/133512* (2013.01); *G02F 1/133514* (2013.01); *G02F 1/133707* (2013.01); *G02F 1/134336* (2013.01); *G02F 1/1339* (2013.01); *G02F 1/133723* (2013.01); *G02F 2001/13712* (2013.01); *G02F 2001/133388* (2013.01); *G02F 2001/133726* (2013.01); *G02F 2001/133742* (2013.01); *G02F 2001/133769* (2013.01); *G02F 2001/134345* (2013.01); *G02F 2201/121* (2013.01); *G02F 2201/122* (2013.01); *G02F 2201/123* (2013.01); *G02F 2201/56* (2013.01)

(58) Field of Classification Search
CPC ............. G02F 1/1333; G02F 1/133711; G02F 1/133512; G02F 1/133514; G02F 1/133707; G02F 1/134336; G02F 1/1368; G02F 1/137; G02F 1/133723; G02F 1/1339; G02F 2001/133726; G02F 2001/133742; G02F 2001/134345; G02F 2001/13712; G02F 2001/133388; G02F 2001/133769; G02F 2201/121; G02F 2201/122; G02F 2201/123; G02F 2201/56
USPC ....................................... 252/299.01; 428/1.1
See application file for complete search history.

(56) References Cited

U.S. PATENT DOCUMENTS

| | | | |
|---|---|---|---|
| 2016/0209707 A1 | 7/2016 | Suh | |
| 2017/0059941 A1* | 3/2017 | Lee | ................... G02F 1/133711 |
| 2017/0090250 A1* | 3/2017 | Kim | ................. G02F 1/133788 |

FOREIGN PATENT DOCUMENTS

| | | |
|---|---|---|
| JP | 201258562 | 3/2012 |
| KR | 20020071724 | 9/2002 |
| KR | 20070021145 | 2/2007 |
| KR | 1020120089080 | 8/2012 |
| KR | 1020150012093 | 2/2015 |
| KR | 1020150040616 | 4/2015 |
| KR | 1020160090451 | 8/2016 |

* cited by examiner

*Primary Examiner* — Geraldina Visconti
(74) *Attorney, Agent, or Firm* — Cantor Colburn LLP

(57) ABSTRACT

A liquid-crystal display device includes a thin-film transistor ("TFT") array flat substrate, an opposing flat substrate, a liquid-crystal layer including liquid-crystal molecules having negative dielectric anisotropy between the TFT array flat substrate and the opposing flat substrate, a pattern electrode between the TFT array flat substrate and the liquid-crystal layer, a first liquid-crystal alignment layer including an electric field sensitive polymer compound between the pattern electrode and the liquid-crystal layer, a patternless electrode between the opposing flat substrate and the liquid-crystal layer and a second liquid-crystal alignment layer between the patternless electrode and the liquid-crystal layer where the electric field sensitive polymer includes a main chain, vertically-aligned side chains, and liquid-crystalline side chains including a mesogen unit having at least two cyclic combinations, a polar group coupled with an end of the mesogen unit, and a flexible group coupled with another end of the mesogen unit.

11 Claims, 23 Drawing Sheets

LIQUID-CRYSTAL DISPLAY DEVICE

This application claims priority to Korean Patent Application No. 10-2016-0006281, filed on Jan. 19, 2016, and all the benefits accruing therefrom under 35 U.S.C. § 119, the content of which in its entirety is herein incorporated by reference.

BACKGROUND

1. Field

Exemplary embodiments of the invention relate to a liquid-crystal display ("LCD") device.

2. Description of the Related Art

A display device is an output device which presents data in a form of images. As the information-oriented society evolves, various demands for display devices are ever increasing. Among various types of display devices, flat panel display devices such as a flat liquid-crystal display ("LCD") device, a flat plasma display panel ("PDP") device, and a flat organic light-emitting diode display ("OLED") device are commonly used.

Recently, a flat LCD device is one of the most widely used flat display devices. A flat LCD device may include flat display substrates facing each other and a liquid-crystal layer interposed therebetween.

As recent flat LCD devices have large screens, there is a difference between viewing angles when a viewer watches a center of the large screen and when the viewer watches a right or left end of the large screen. Accordingly, a research is on going into a curved LCD device for compensating such difference in viewing angle.

The curved LCD device may be fabricated by bending a flat LCD device. From a viewer's perspective, the curved LCD devices may be classified as a portrait type curved LCD device having its height larger than its width and bent in a vertical direction, and a landscape type curved LCD device having its width larger than its height and bent in a horizontal direction.

SUMMARY

Exemplary embodiments of the invention provide a liquid-crystal display ("LCD") device with improved response characteristics and light transmittance.

An LCD device includes a thin-film transistor ("TFT") array flat substrate, an opposing flat substrate facing the TFT array flat substrate, a liquid-crystal layer interposed between the TFT array flat substrate and the opposing flat substrate, a pattern electrode disposed between the TFT array flat substrate and the liquid-crystal layer, a first liquid-crystal alignment layer disposed between the pattern electrode and the liquid-crystal layer, a patternless electrode disposed between the opposing flat substrate and the liquid-crystal layer and a second liquid-crystal alignment layer disposed between the patternless electrode and the liquid-crystal layer. The liquid-crystal layer includes liquid-crystal molecules having negative dielectric anisotropy. The first liquid-crystal alignment layer includes an electric field sensitive polymer compound. The electric field sensitive polymer includes a main chain, vertically-aligned side chains, and liquid-crystalline side chains. The liquid-crystalline side chains includes a mesogen unit having at least two cyclic compounds, a polar group coupled with an end of the mesogen unit, and a flexible group coupled with another end of the mesogen unit.

According to an exemplary embodiment of the invention, an LCD device with improved response characteristics such as a light transmittance may be provided.

BRIEF DESCRIPTION OF THE DRAWINGS

The above and other exemplary embodiments and features of the invention will become more apparent by describing in detail exemplary embodiments thereof with reference to the attached drawings, in which.

DETAILED DESCRIPTION

Figure 1:
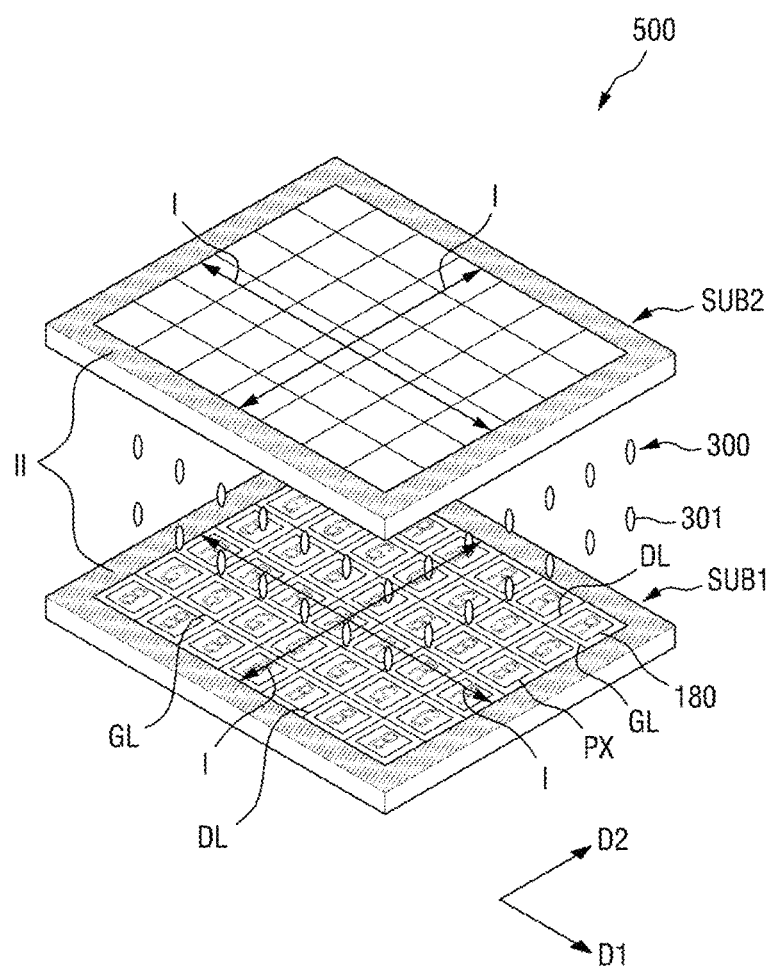
FIG. 1 is a perspective view of an exemplary embodiment of a flat liquid-crystal display ("LCD") device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Although the terms "first", "second", etc. may be used herein to describe various elements, these elements should not be limited by these terms. These terms may be used to distinguish one element from another element. Thus, a first element described in this application may be termed a second element without departing from teachings of one or more embodiments. The description of an element as a "first" element may not require or imply the presence of a second element or other elements. The terms "first", "second", etc. may also be used to differentiate different categories or sets of elements. For conciseness, the terms "first", "second", etc. may represent, for example, "first-category (or first-set)", "second-category (or second-set)", etc., respectively.

When a first element is referred to as being "on", "connected to", or "coupled to" a second element, the first element can be directly on, directly connected to, or directly coupled to the second element, or one or more intervening elements may be present. In contrast, when a first element is referred to as being "directly on", "directly connected to", or "directly coupled to" a second element, there are no intervening elements intentionally provided between the first element and the second element. Like numbers may refer to like elements in this application. The term "and/or" includes any and all combinations of one or more of the associated items.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features.

The terminology used herein is for the purpose of describing particular embodiments only and is not intended to be limiting. As used herein, the singular forms "a", "an", and "the" are intended to include the plural forms as well, unless the context clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Embodiments are described herein with reference to cross-section illustrations that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of embodiments.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the symbol "$C_{A \sim B}$" denotes that "the carbon number is between A and B."

Exemplary embodiments of the invention will hereinafter be described with reference to the accompanying drawings.

FIG. 1 is a perspective view of a flat liquid-crystal display ("LCD") device 500 according to an exemplary embodiment of the invention.

Referring to FIG. 1, the flat LCD device 500 may include a flat display substrate SUB1, an opposing flat display substrate SUB2 spaced apart from the flat display substrate SUB1 with a predetermined cell gap therebetween, and a liquid-crystal layer 300 interposed between the flat display substrate SUB1 and the opposing flat display substrate SUB2.

The flat LCD device 500 includes a display area I and a non-display area II. In the display area I, images are displayed. In the non-display area II surrounding the display area I, no image is displayed.

The liquid-crystal layer 300 may include liquid-crystal molecules having negative dielectric anisotropy. In the following description, liquid-crystal molecules having negative dielectric anisotropy are referred to as negative liquid-crystal molecules 301.

The flat display substrate SUB1 may include a plurality of gate lines GL extending in a first direction D1, and a plurality of data lines DL extending in a second direction D2 perpendicular to the first direction D1. Although not shown in the drawings, the gate lines GL may be not only disposed in the display area I but also extended to the non-display area II. In addition, a gate pad (not shown) may be disposed in the non-display area II. Further, in the non-display area II, the flat display substrate SUB1 may include a gate pad (not shown). The data lines DL may be not only disposed in the display area I but also extended to the non-display area II. In addition, a data pad (not shown) may be disposed in the non-display area II. Further, in the non-display area II, the flat display substrate SUB1 may include a data pad (not shown).

In the display area I, a plurality of pixels PX may be defined by the gate lines GL and the data lines DL and may be arranged in a matrix. However, the invention is not limited thereto, and plurality of pixels PX may not be defined by the gate lines GL and the data lines DL. Each of the plurality of pixels PX may include a pixel electrode 180. In the display area I, the flat display substrate SUB1 may include a plurality of pixels PX arranged in a matrix and pixel electrodes 180.

In the non-display area II, a driving part (not shown) for applying a gate driving signal, a data driving signal and the like to each of the pixels PX may be disposed. Further, in the non-display area II, the flat display substrate SUB1 may include the driving part (not shown).

The flat display substrate SUB1 may include a thin-film transistor array flat substrate (not shown), a pixel electrode (not shown), a first liquid-crystal alignment layer (not shown), and a light-blocking pattern layer (not shown). The opposing flat display substrate SUB2 may include a second flat substrate (not shown), a common electrode (not shown), and a second liquid-crystal alignment layer (not shown). Hereinafter, the flat display substrate SUB1, the opposing flat display substrate SUB2, and the liquid-crystal layer 300 of the flat LCD device 500 in an initial state where no electric field is applied will be described in detail with reference to FIGS. 1 and 2.

Figure 2:
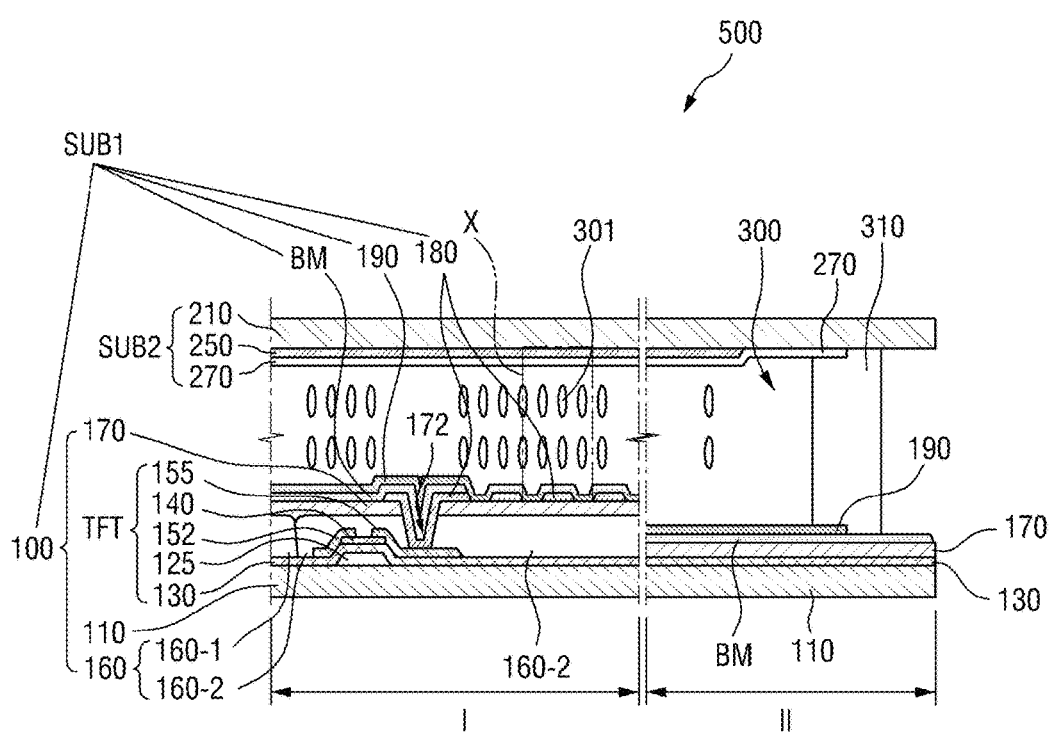
FIG. 2 is a cross-sectional view of the flat LCD device shown in FIG. 1 in an initial state where no electric field is applied.

FIG. 2 is a cross-sectional view of the flat LCD device 500 in the initial state where no electric field is applied.

The flat display substrate SUB1 may include a thin-film transistor array flat substrate 100, a pixel electrode 180, a light-blocking pattern layer BM, and a first liquid-crystal alignment layer 190. The pixel electrode 180 may be disposed between the thin-film transistor array substrate 100 and the liquid-crystal layer 300, and between the thin-film transistor array substrate 100 and the light-blocking pattern layer BM. The first liquid-crystal alignment layer 190 may be disposed between the pixel electrode 180 and the liquid-crystal layer 300 in the display area I and between the light-blocking pattern layer BM and the liquid-crystal layer 300 in the non-display area II.

The thin-film transistor array substrate 100 may include a flat substrate 110, a thin-film transistor TFT, a color filter layer 160 and an organic layer 170.

In an exemplary embodiment, the flat substrate 110 is a base substrate of the thin-film transistor array substrate 100 and may include a transparent insulative substrate such as glass or transparent plastic.

The thin-film transistor TFT is a switching element and may include a gate electrode 125, a gate insulative film 130, a semiconductor layer 140, a source electrode 152 and a drain electrode 155. The gate electrode 125 functions as the control terminal of the thin-film transistor TFT. The gate electrode 125 may be disposed on the flat substrate 110 and includes a conductive material. The gate electrode 125 may branch off from the gate lines GL. The gate insulative film 130 may be disposed between the gate electrode 125 and the semiconductor layer 140 to insulate one from the other. The gate insulative film 130 may be provided from the display area I to the non-display area II. The semiconductor layer 140 functions as a chain layer of the thin-film transistor TFT, and may be disposed on the gate insulation film 130. The source electrode 152 and the drain electrode 155 may be disposed on the semiconductor layer 140 spaced apart from each other, and may include a conductive material. The source electrode 152 functions as an input terminal of the thin-film transistor TFT. The drain electrode 155 functions as an output terminal of the thin-film transistor TFT. The source electrode 152 and the drain electrode 155 may branch off from the data lines DL. Ohmic contact layers (not shown) may be disposed between the source electrode 152 and the semiconductor layer 140 and between the drain electrode 155 and the semiconductor layer 140, respectively.

The color filter layer 160 may be disposed over the switching element TFT and may include an area overlapping the source electrode 152 and the drain electrode 155. The color filter layer 160 may be provided in every pixel in the display area I, and may include a first color filter 160-1 and a second color filter 160-2. In an exemplary embodiment, the first color filter 160-1 and the second color filter 160-2 may produce different colors. In an exemplary embodiment, each of the first color filter 160-1 and the second color filter 160-2 may be one of a red color filter R, a green color filter G and a blue color filter B, for example. However, the invention is not limited thereto, and the first color filter 160-1 and the second color filter 160-2 may be various other color filters. The first color filter 160-1 and the second color filter 160-2 may be disposed alternately.

The organic layer 170 including an organic material may be disposed on the color filter layer 160. The organic layer 170 may be extended to the non-display area II.

The pixel electrode 180 including a conductive material may be disposed on the organic layer 170 in every pixel PX. The pixel electrode 180 may be electrically connected to the drain electrode 155 via a contact hole 172 that penetrates the color filter layer 160 and the organic film 170. In an exemplary embodiment, the pixel electrode 180 may include indium tin oxide ("ITO"), indium zinc oxide ("IZO"), indium oxide, zinc oxide, tin oxide, gallium oxide, titanium oxide, aluminum, silver, platinum, chrome, molybdenum, tantalum, niobium, zinc, magnesium, and an alloy thereof or a stack of layers thereof, for example.

The pixel electrode 180 is a pattern electrode having at least one of a protruding pattern and a slit pattern. In an exemplary embodiment, the pixel electrode 180 may be a pattern electrode in which the slit pattern is defined. The pixel electrode 180, along with the common electrode 250, may generate electric field so as to control orientations of liquid crystal molecules 301 in the liquid-crystal layer 300 interposed therebetween.

The light-blocking pattern layer BM may be disposed on the thin-film transistor array substrate 100 and the pixel electrode 180. The light-blocking pattern layer BM is also commonly referred to as a black matrix. In the display area I, the light-blocking pattern layer BM may overlap the thin-film transistor TFT and the boundary between the first color filter 160-1 and the second color filter 160-2. The light-blocking pattern layer BM may be not only disposed in the display area I but also extended to the non-display area II.

The first liquid-crystal alignment layer 190 may be disposed on the pixel electrode 180 and the light-blocking pattern layer BM. The first liquid-crystal alignment layer 190 may be not only disposed in the display area I but also extended to the non-display area II. A seal line 310 has a weak adhesion on the first liquid-crystal alignment layer 190. Therefore, when the seal line 310 is disposed on the first liquid-crystal alignment layer 190, the flat display substrate SUB1 may be separated from the opposing flat display substrate SUB2. Accordingly, it is desired that the first liquid-crystal alignment layer 190 does not contact the seal line 310 in the non-display area II. When the LCD device 500 is designed to have a narrow bezel, however, a portion of the seal line 310 may be disposed on the first liquid-crystal alignment layer 190. The first liquid-crystal alignment layer 190 will be described in more detail with reference to FIGS. 3 to 5.

The opposing flat display substrate SUB2 is opposed to the flat display substrate SUB1 and may include an opposing flat substrate 210, a common electrode 250, and a second liquid-crystal alignment layer 270.

In an exemplary embodiment, the opposing flat substrate 210 is a base substrate of the opposing flat display substrate SUB2 and may include a transparent insulative substrate such as glass or transparent plastic.

The common electrode 250 may be disposed on the opposing flat substrate 210. The common electrode 250 is a patternless electrode with no slit pattern and no protruding pattern. In the flat LCD device 500, the pattern electrode is disposed only on the flat display substrate SUB1, and the patternless electrode is disposed on the opposing flat display substrate SUB2, such that the orientation of the liquid-crystal molecules 301 is controlled by using the pattern electrode. In an exemplary embodiment, the common electrode 250 may include ITO, IZO, indium oxide, zinc oxide, tin oxide, gallium oxide, titanium oxide, aluminum, silver, platinum, chrome, molybdenum, tantalum, niobium, zinc, magnesium, and an alloy thereof or a stack of layers thereof, for example. The common electrode 250 may cover the entirety of the display area I. On the entire surface of the display area I, the common electrode 250 may be disposed across pixels, as a single piece. The common electrode 250 may be extended to a part of the non-display area II.

The second liquid-crystal alignment layer 270 may be disposed on the common electrode 250. The second liquid-crystal alignment layer 270 may be not only disposed in the display area I but also extended to the non-display area II. A seal line 310 has a weak adhesion on the second liquid-crystal alignment layer 270. Therefore, when the seal line 310 is disposed on the second liquid-crystal alignment layer 270, the flat display substrate SUB1 may be separated from the opposing flat display substrate SUB2. Accordingly, it is desired that the second liquid-crystal alignment layer 270 does not contact the seal line 310 in the non-display area II. When the LCD device 500 is designed to have a narrow bezel, however, a portion of the seal line 310 may be disposed on the second liquid-crystal alignment layer 270. The second liquid-crystal alignment layer 270 will be described in more detail with reference to FIGS. 3 to 5.

The flat display substrate SUB1 and the opposing flat display substrate SUB2 may be coupled together with the seal line 310 including sealant or the like. The seal line 310 may be located in the non-display area II. The seal line 310 is provided along the edge of the display area I to surround the display area I. In the non-display area II, it is desired that the first and second liquid-crystal alignment layers 190 and 270 are disposed inner side of the seal line 310. When the LCD device 500 is designed to have a narrow bezel, however, ends of the first and second liquid-crystal alignment layers 190 and 270 may partially overlap the seal line 310.

In the initial state where no electric field is applied to the flat LCD device 500, the negative liquid-crystal molecules 301 may be oriented substantially vertically with respect to the flat display substrate SUB1 and the opposing flat display substrate SUB2. As used herein, the expression "the negative liquid-crystal molecules 301 are oriented substantially vertically with respect to the flat display substrate SUB1 and the opposing flat display substrate SUB2" is intended to indicate that "the negative liquid-crystal molecules 301 are oriented with a pretilt angle from about 88° to about 90° with respect to the flat display substrate SUB1 and the opposing flat display substrate SUB2." The pretilt angle refers to an angle between the flat display substrate SUB1 and directors of the negative liquid-crystal molecules 301 and an angle between the opposing flat display substrate SUB2 and the directors of the negative liquid-crystal molecules 301.

Figure 3A:
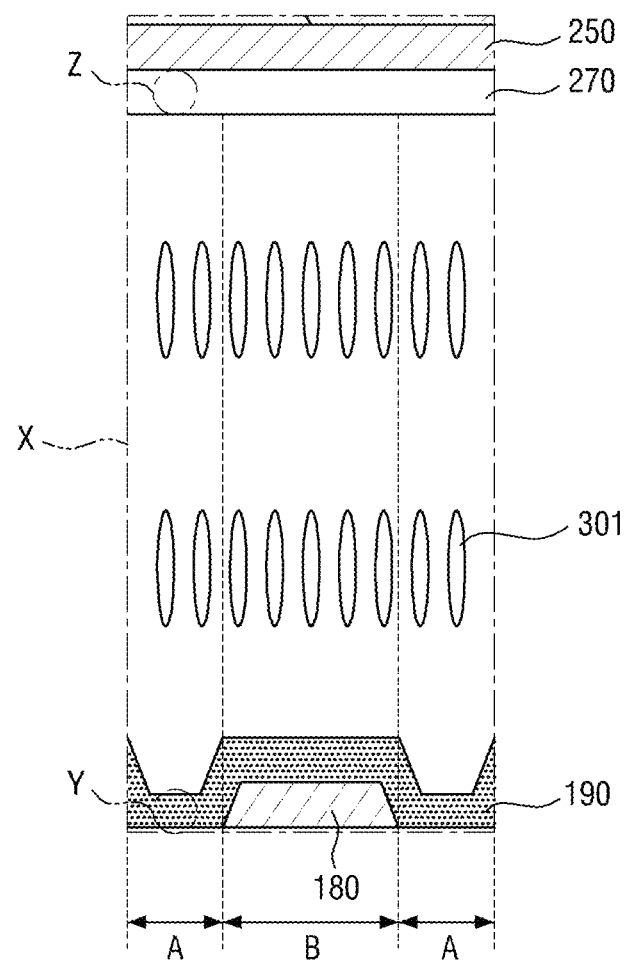
FIG. 3A is an enlarged view of an area X of FIG. 2, and FIGS. 3B and 3C are enlarged views of areas Y and Z of FIG. 3A, respectively.
Figure 3B:
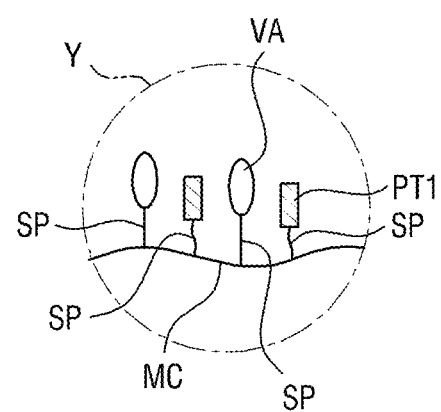
Figure 3C:
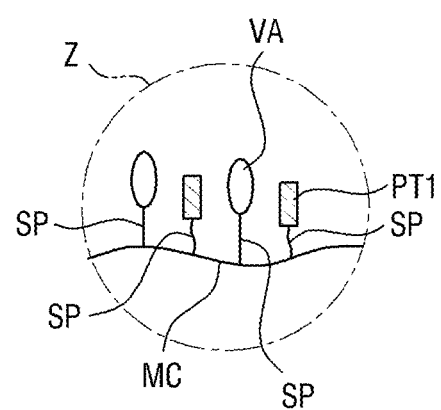
Figure 4:
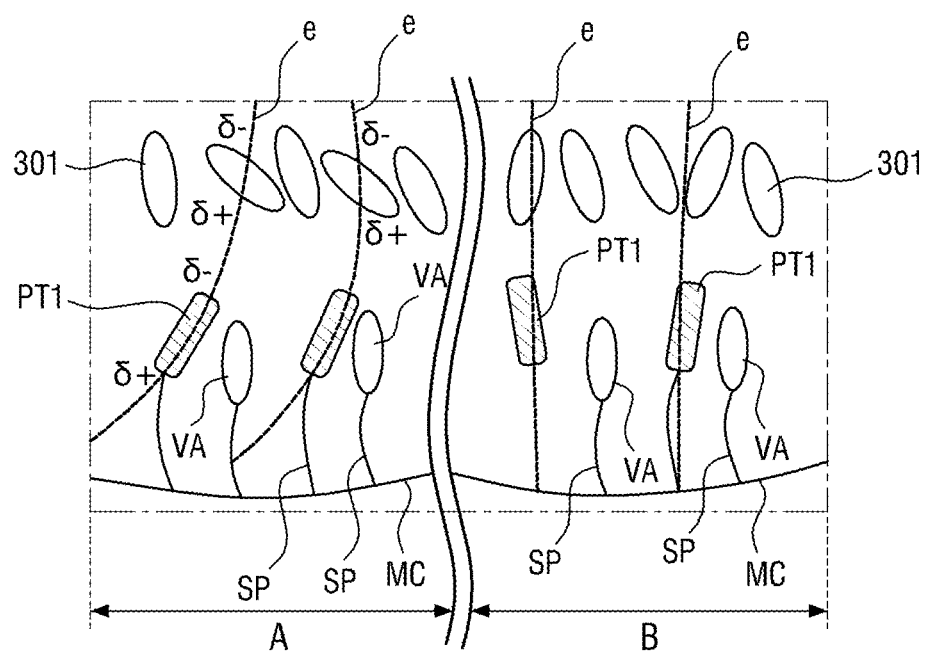
FIG. 4 is a view showing the behavior of liquid-crystal molecules in a fringe field area and a vertical field area immediately after electric field is applied to the flat LCD device shown in FIG. 2.
Figure 5:
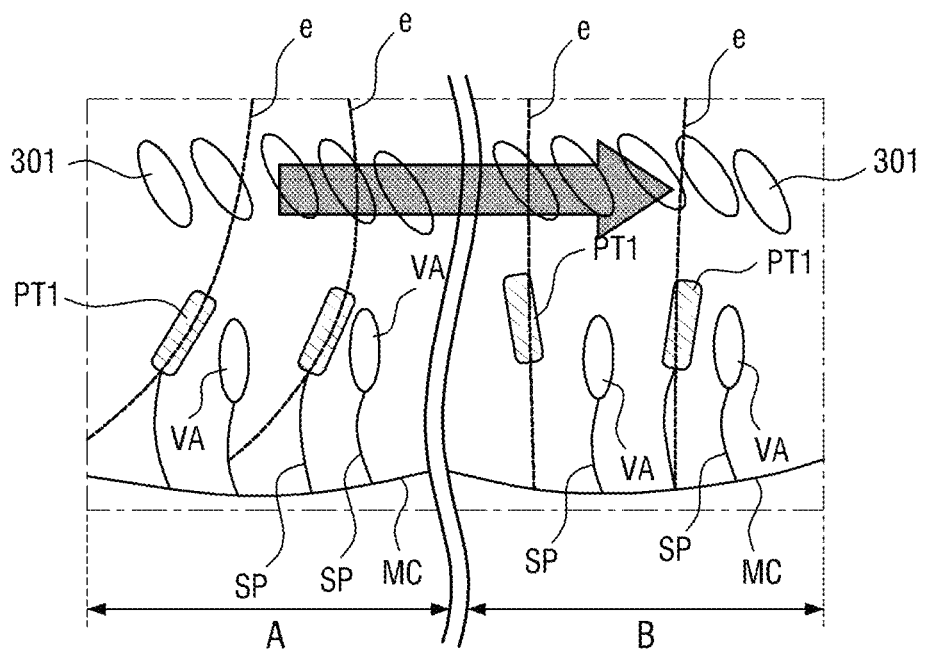
FIG. 5 is a view showing the behavior of liquid-crystal molecules in a fringe field area and a vertical field area in the final state after electric field is applied to the flat LCD device shown in FIG. 2.

FIG. 3A is an enlarged view of area X of the flat LCD device 500 shown in FIG. 2, and FIGS. 3B and 3C are enlarged views of areas Y and Z of FIG. 3A, respectively. FIG. 4 is a view showing the behavior of the negative liquid-crystal molecules 301 in fringe field area A and vertical field area B immediately after electric field is applied to the flat LCD device 500 shown in FIG. 2. FIG. 5 is a view showing the behavior of the negative liquid-crystal molecules 301 in fringe field area A and vertical field area B in the final state after electric field is applied to the flat LCD device 500 shown in FIG. 2.

Referring to FIGS. 3A and 3B, in area Y, the first liquid-crystal alignment layer 190 may include a first electric field sensitive polymer compound including a main chain MC, vertically-aligned side chains VA and positive liquid-crystalline side chains PT1 having a polar group. Herein, the first liquid-crystal alignment layer 190 may be defined as a first electric field sensitive liquid-crystal alignment layer.

The first electric field sensitive polymer compound may be a polyimide-based polymer compound in which a main chain MC includes an imide group in a repeat unit and which includes vertically-aligned side chains VA and positive liquid-crystalline side chains PT1. The vertically-aligned side chains VA and the positive liquid-crystalline side chains PT1 may be chemically bonded to the main chain MC via the respective spacer groups SP.

In an exemplary embodiment, the vertically-aligned side chains VA may be a $C_{1-8}$ alkyl group, a hydrocarbon derivative having a terminal substituted with a $C_{1-8}$ alkyl group, a hydrocarbon derivative having a terminal substituted with a $C_{3-6}$ cycloalkyl group, a hydrocarbon derivative having a terminal substituted with an aromatic hydrocarbon, etc., for example. Referring to FIGS. 2 and 3, in the initial state where no electric field is applied to the flat LCD device 500 shown in FIG. 2, the vertically-aligned side chains VA may align the negative liquid-crystal molecules 301 substantially vertically with respect to the flat display substrate SUB1 and the opposing flat display substrate SUB2.

In an exemplary embodiment, the vertically-aligned side chains VA may be a compound expressed in Chemical Formula 1 below, for example:

[Chemical Formula 1]

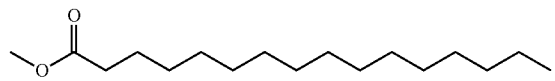

When electric field is applied to the flat LCD device 500 shown in FIG. 2, the positive liquid-crystalline side chains PT1 have their major axis aligned along the electric field direction in the fringe field area A, and the dielectric constant of the major axis is larger than that of the minor axis. The positive liquid-crystalline side chains may electrostatically react with the negative liquid-crystal molecules 301, so that the positive liquid-crystalline side chains may pretilt the negative liquid-crystal molecules 301 in the fringe field area A.

The positive liquid-crystalline side chains PT1 may include a mesogen structure for exhibiting liquid crystalline property, a polar group coupled with an end of the mesogen structure, and a flexible group coupled with the other end of the mesogen structure. The mesogen structure has affinity for the negative liquid-crystal molecules 301 and includes at least two cyclic compounds. In an exemplary embodiment, the at least two cyclic compounds may be, for example, a bicyclohexyl group, a cyclohexyl-phenyl group, a biphenyl group, a terphenly group, naphthalene, for example. In an exemplary embodiment, the polar group may enhance alignment control over the negative liquid-crystal molecules 301 and may be at least one of fluorine group (—F) and cyanogens group (—CN), for example. In an exemplary embodiment, the flexible group may be, for example, $C_{1-8}$ alkyl group or $C_{1-8}$ alkoxy group.

In an exemplary embodiment, the positive liquid-crystalline side chains PT1 may be a compound expressed in Chemical Formula 2 below, for example:

[Chemical Formula 2]

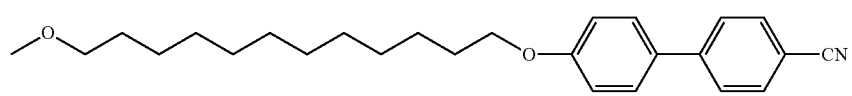

In an exemplary embodiment, the content ratio between the vertically-aligned side chains VA and the positive liquid-crystalline side chains PT1 may range from 50:50 to 95:5, preferably from 50:50 to 70:30, for example.

Referring to FIG. 4, immediately after electric field e is applied to the LCD device 500 shown in FIG. 2, in the fringe field area A, some of the negative liquid-crystal molecules 301 may electrostatically react with the positive liquid-crystalline side chains PT1 such that the major axis may be substantially perpendicular to the electric field e. In the vertical field area B where anchoring energy is weak, the negative liquid-crystal molecules 301 may be randomly oriented with no directivity.

Referring to FIG. 5, however, in the final state after the electric field e is applied to the LCD device 500 shown in FIG. 2, the directors of the negative liquid-crystal molecules 301 in the fringe field area A propagates quickly to the vertical field area B as indicated by the arrow, such that in both of the fringe field area A and the vertical field area B, the major axis of the negative liquid-crystal molecules 301 may be substantially perpendicular to the electric field e.

Referring back to FIGS. 3A and 3C, in area Z, the second liquid-crystal alignment layer 270 may include the first electric field sensitive polymer compound. Herein, the second liquid-crystal alignment layer 270 may be defined as a first electric field sensitive liquid-crystal alignment layer.

Although not shown in the drawings, the second liquid-crystal alignment layer 270 may include a vertically-aligned polymer compound that does not include the positive liquid-crystalline side chains PT1 and includes the main chain MC and the vertically-aligned side chains VA. In that case, the second liquid-crystal alignment layer 270 may be defined as a vertically-aligned liquid-crystal alignment layer. In an exemplary embodiment, the vertically-aligned polymer compound may be a polyimide-based polymer compound in which the main chain includes an imide group in a repeat unit and which is composed only of the vertically-aligned side chains, for example.

Figure 6:
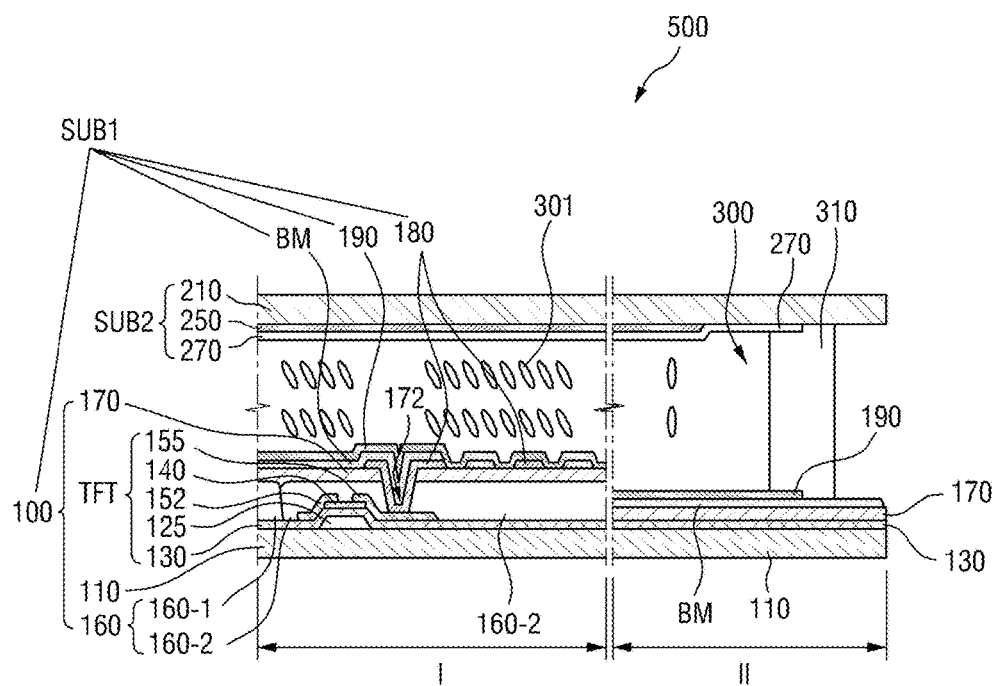
FIG. 6 is a cross-sectional view of the flat LCD device shown in FIG. 2 in the final state after electric field is applied thereto.
Figure 7:
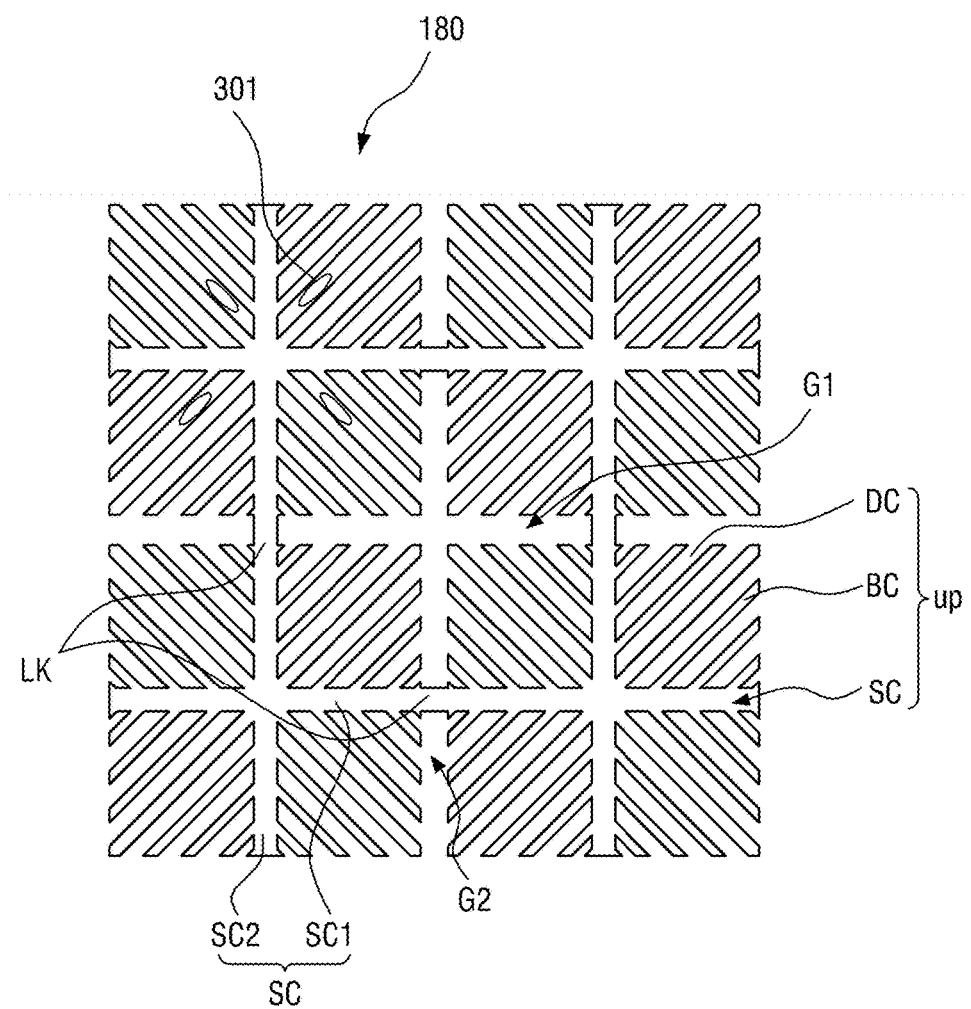
FIG. 7 is a plan view of a part of a pixel electrode of the flat LCD device shown in FIG. 6.
Figure 8:
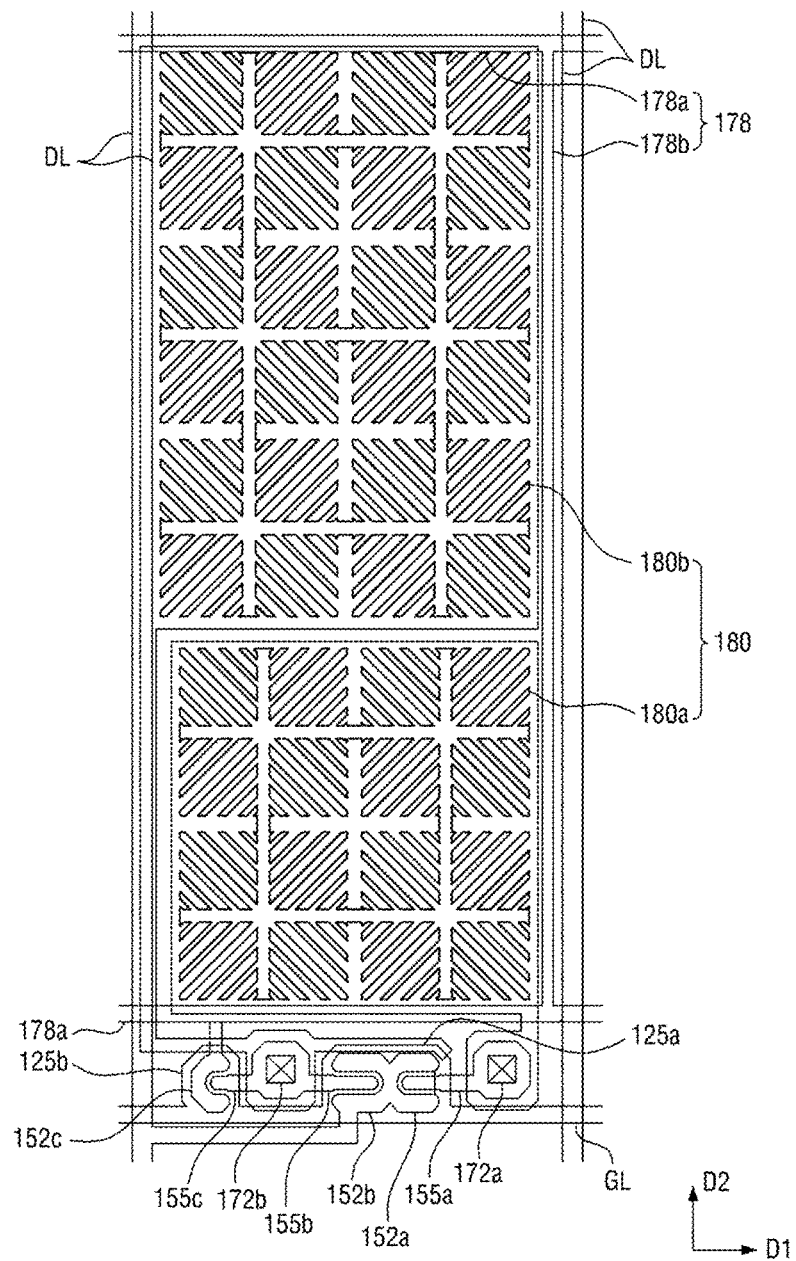
FIG. 8 is a plan view of a pixel of the flat LCD device shown in FIG. 6.

FIG. 6 is a cross-sectional view of the flat LCD device 500 shown in FIG. 2 in the final state after electric field is applied thereto. FIG. 7 is a plan view of a part of a pixel electrode 180 of the flat LCD device 500 shown in FIG. 6. FIG. 8 is a plan view of a pixel of the flat LCD device 500 shown in FIG. 6.

Referring to FIGS. 2 and 6, in the initial state where no electric field is applied to the flat LCD device 500, the negative liquid-crystal molecules 310 are oriented substantially vertically with respect to the flat display substrate SUB1 and the opposing flat display substrate SUB2. In contrast, in the final state where electric field is applied to the flat LCD device 500, the negative liquid-crystal molecules 310 may be inclined at a pretilt angle with respect to the direction vertical to the flat display substrate SUB1 and the opposing flat display substrate SUB2.

Referring to FIG. 7, for example, the pixel electrode 180 may include a plurality of unit electrodes UP. Each of the unit electrodes UP may be a slit pattern electrode including a cross-like stem SC, minute branches BC extending from the cross-like stem SC where slits DC are defined between the minute braches BC. Specifically, the cross-like stem SC may have a cross+shape with horizontal stems SC1 and vertical stems SC2 intersecting one another. In an exemplary embodiment, the minute branches BC may extend radially from the cross-like stem SC at approximately 45°, for example. In an exemplary embodiment, the slits DC may extend radially from the cross-like stem SC at approximately 45°, for example. In an exemplary embodiment, the negative liquid-crystal molecules 301 may extend radially from the cross-like stem SC at approximately 45° along the slits DC, for example.

The pixel electrode 180 may further include links LK connecting the cross-like stems SC of the unit electrodes UP arranged roughly in a matrix with one another. Horizontal gaps G1 and vertical gaps G2 may exist between the unit electrodes UP arranged roughly in a matrix.

Referring to FIG. 8, a pixel electrode 180 may be disposed on a pixel area defined by gate lines GL extending in a first direction D1 and data lines DL extending in a second direction D2 perpendicular to the first direction D1. The pixel electrode 180 may include a first sub-pixel electrode 180a and a second sub-pixel electrode 180b. In an exemplary embodiment, the first sub-pixel electrode 180a may include four unit electrodes, for example. In an exemplary embodiment, the second sub-pixel electrode 180b may include six unit electrodes, for example. As such, the first sub-pixel electrode 180a and the second sub-pixel electrode 180b have different areas, thereby improving side visibility. However, the invention is not limited thereto, and the first sub-pixel electrode 180a and the second sub-pixel electrode 180b may include different numbers of the unit electrodes.

The gate lines GL may include gate electrodes 125a and 125b protruding therefrom in the second direction D2 toward the pixel electrode 180. The data lines DL may include source electrodes 152a and 152b, and drain electrodes 155a and 155b. The source electrodes 152a and 152b may protrude from the data lines DL and may have a "U" shape. The drain electrodes 155a and 155b may be spaced apart from the source electrodes 152a and 152b. The first sub-pixel electrode 180a may be electrically connected to a drain electrode 155a via a contact hole 172a. The second sub-pixel electrode 180b may be electrically connected to a drain electrode 155b via a contact hole 172b.

The reference voltage line 178 may include horizontal reference voltage lines 178a extending in the first direction D1, and vertical reference voltage lines 178b extending in the second direction D2 and connecting the horizontal reference voltage lines 178a with one another to thereby prevent delay in a signal flowing in the reference voltage line 178. A lower horizontal reference voltage line 178a of the horizontal reference voltage lines 178a may overlap a part of the first sub-pixel electrode 180a between the first sub-pixel electrode 180a and the gate electrodes 125a and 125b, and may include a source electrode 152c protruding in the second direction D2 from the lower horizontal reference voltage line 178a toward the opposite direction of the pixel electrode 180. The source electrode 152c may overlap the gate electrode 125b and may be spaced apart from the drain electrode 155c. The drain electrode 155c may be electrically connected to the second sub-pixel electrode 180b via a contact hole 172b. An upper reference voltage line 178a of the horizontal reference voltage lines 178a may be spaced apart from the lower horizontal reference voltage line 178b. Unit electrodes of the first sub-pixel electrode 180a and the second sub-pixel electrode 180b may be disposed between the upper horizontal reference voltage line 178a and the lower horizontal reference voltage line 178b.

Figure 9:
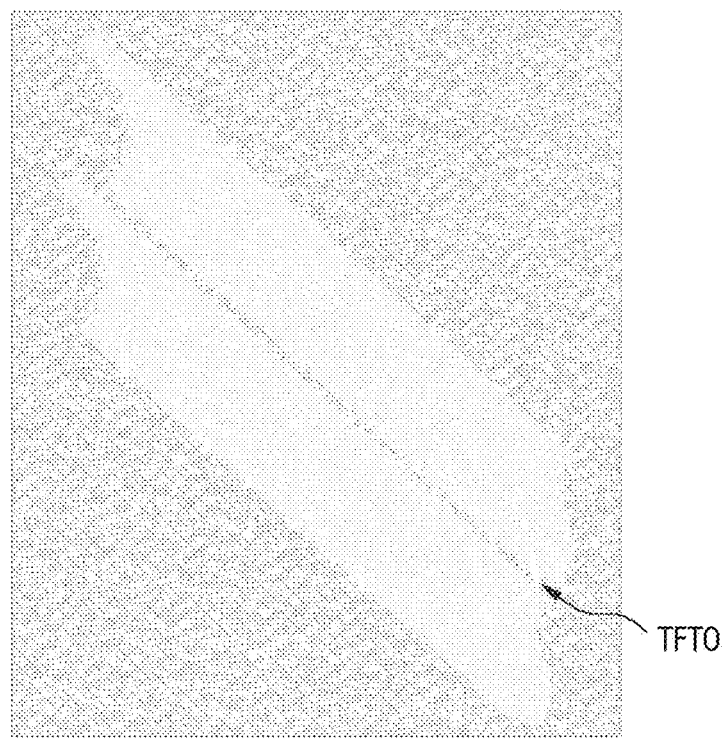
FIG. 9 is an image of an initial behavior of the flat LCD device shown in FIG. 2.
Figure 10:
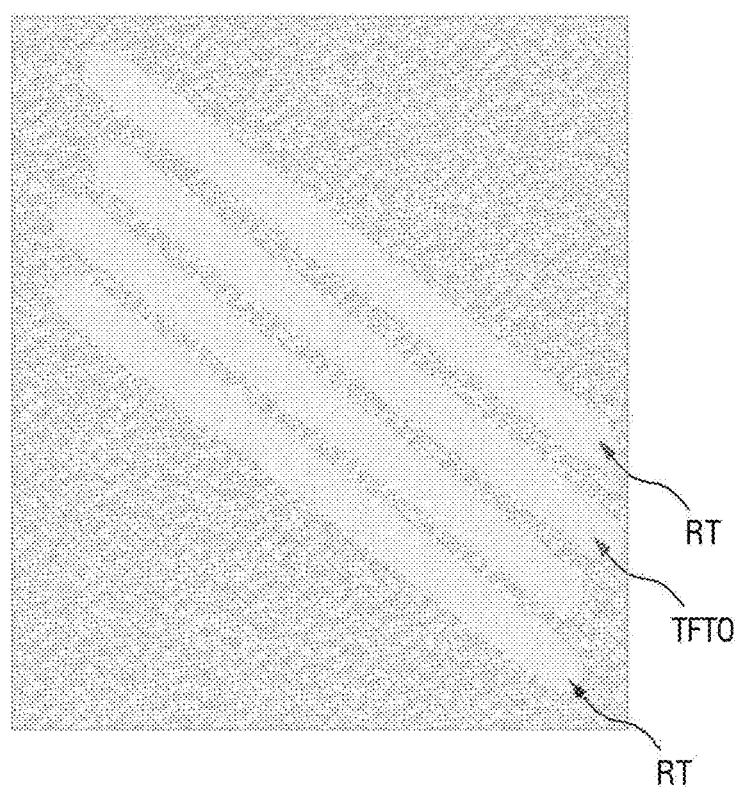
FIG. 10 is an image of a comparative example of an initial behavior of a flat LCD device according to the invention.
Figure 11:
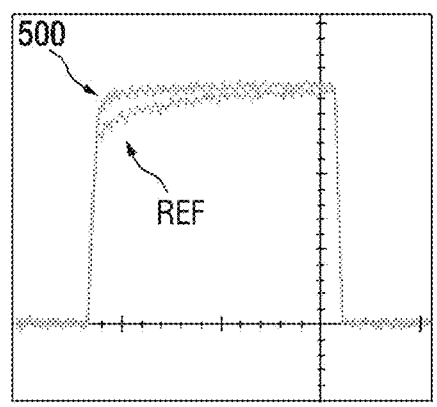
FIG. 11 is an image for comparing a response waveform of the flat LCD device shown in FIG. 2 with a response waveform of the LCD device according to the comparative example.

FIG. 9 is an image of an initial behavior of the flat LCD device 500 shown in FIG. 2. FIG. 10 is an image of an initial behavior of a flat LCD device REF according to a comparative example. FIG. 11 is an image for comparing a response waveform of the flat LCD device 500 shown in FIG. 2 with a response waveform of the LCD device REF according to the comparative example.

Referring back to FIG. 2, in the flat LCD device 500 shown in FIG. 2, the liquid-crystal layer 300 including the negative liquid-crystal molecules 301 is interposed between the flat display substrate SUB1 and the opposing flat display substrate SUB2. Among the electric field generating electrodes, the pixel electrode 180 is a pattern electrode, and the common electrode 250 is a patternless electrode. The first liquid-crystal alignment layer 190 may be the first electric field sensitive liquid-crystal alignment layer. The second liquid-crystal alignment layer 270 may be the first electric field sensitive liquid-crystal alignment layer or the vertically-aligned liquid-crystal alignment layer.

In contrast, in the flat LCD device REF according to the comparative example, the liquid-crystal layer including the negative liquid-crystal molecules is interposed between the flat display substrate SUB1 and the opposing flat display substrate SUB2. All of the electric field generating electrodes are pattern electrodes. All of the liquid-crystal alignment layers are the vertically-aligned liquid-crystal alignment layer. In the following description, the LCD device REF according to the comparative example is also referred to as a patterned vertical alignment mode LCD device.

Referring to FIGS. 9 and 10, it is seen that unlike the flat LCD device REF according to the comparative example, in the flat LCD device 500 shown in FIG. 2, no texture RT is seen at the ends of the thin-film transistor opening TFTO caused by collision of the orientation of the negative liquid-crystal molecules.

In addition, it is seen from FIG. 11 that the flat LCD device 500 shown in FIG. 2 exhibits the improved response waveform over the LCD device REF according to the comparative example.

Figure 12:
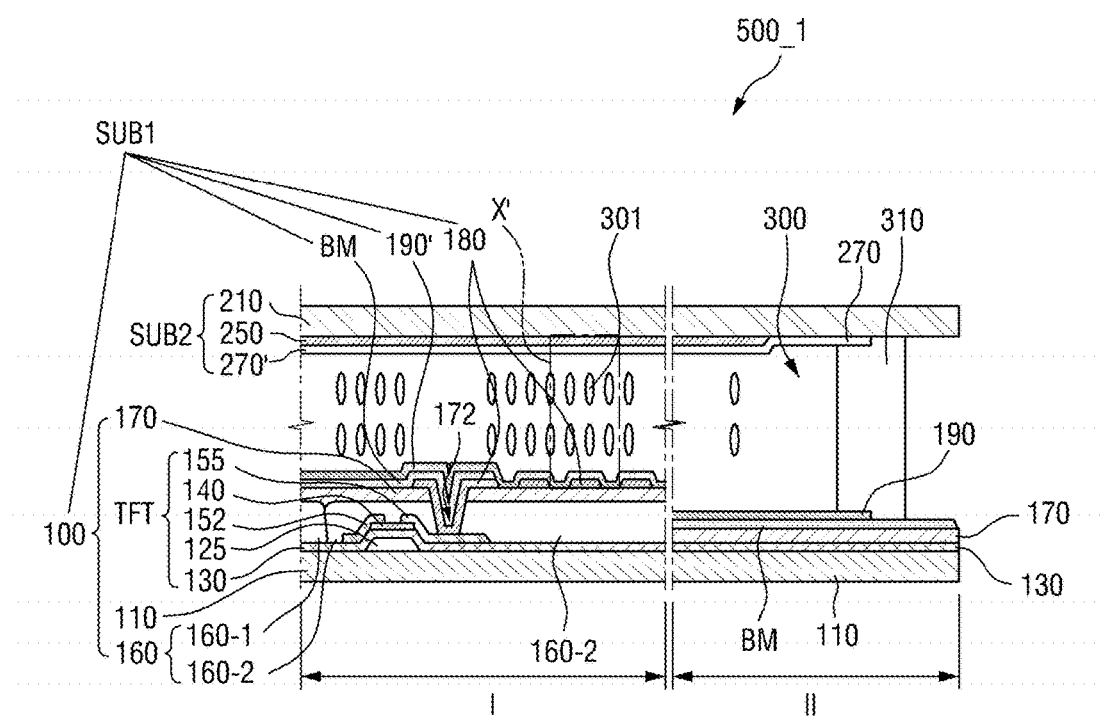
FIG. 12 is a cross-sectional view of another exemplary embodiment the flat LCD device in the initial state where no electric field is applied.
Figure 13A:
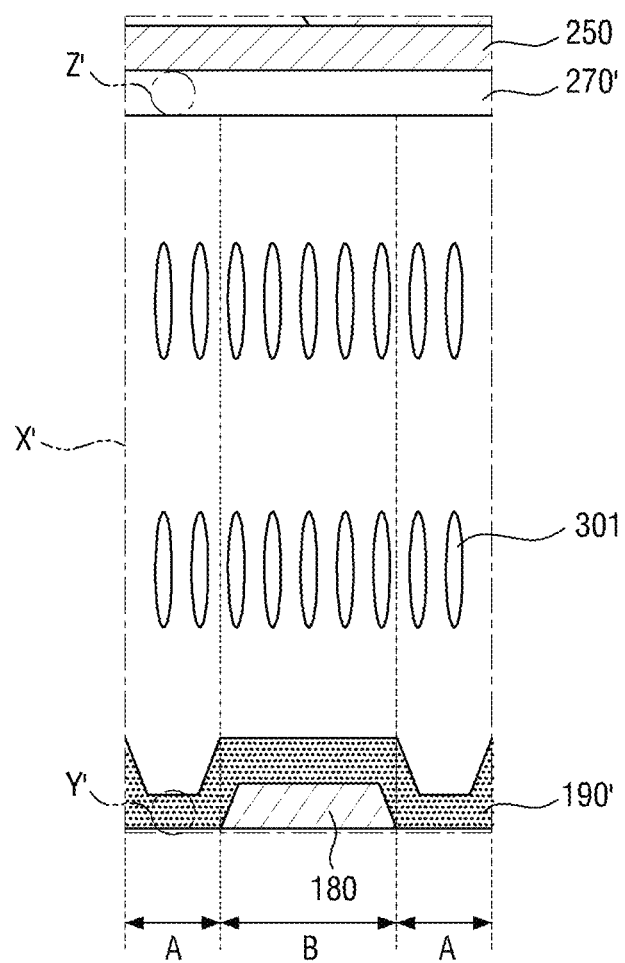
FIG. 13A is an enlarged view of an area X' of FIG. 12, and FIGS. 13B and 13C are enlarged views of areas Y' and Z' of FIG. 13A, respectively.
Figure 13B:
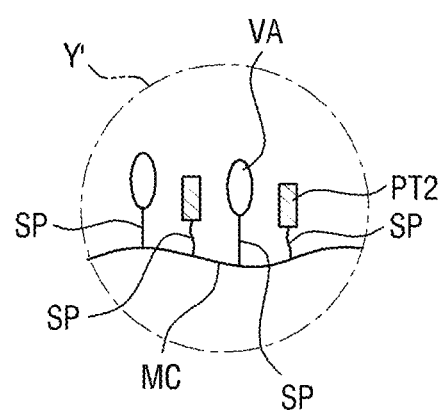
Figure 13C:
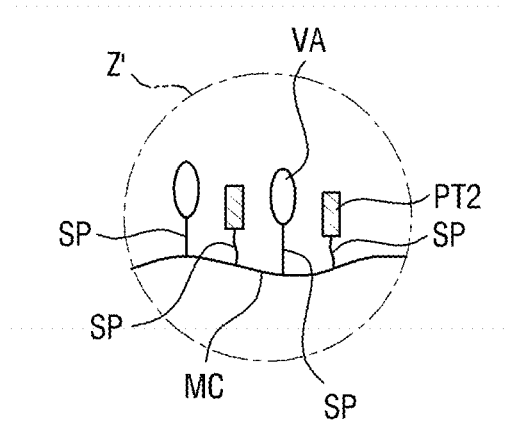
Figure 14:
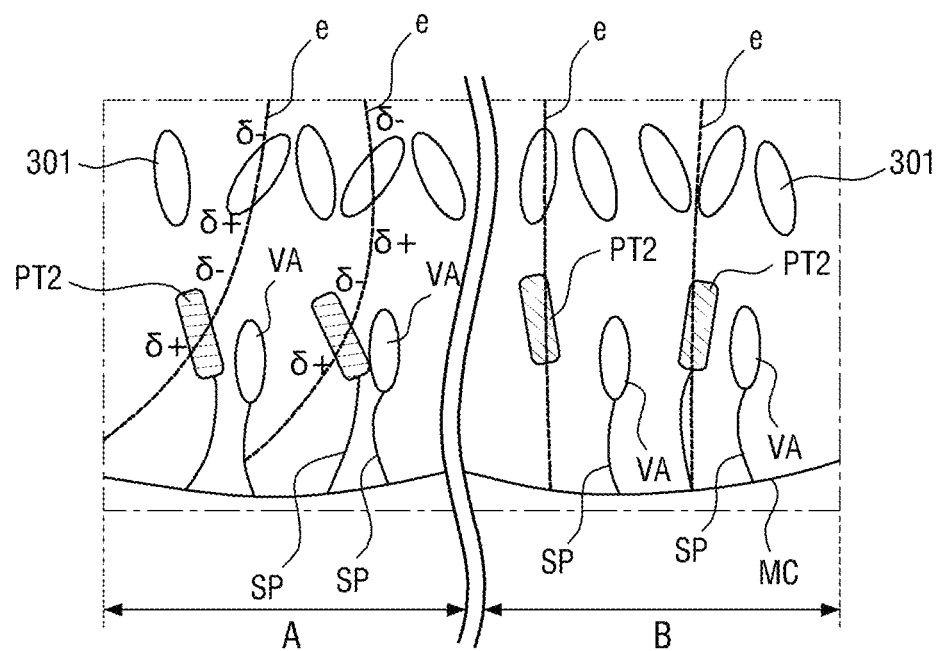
FIG. 14 is a view showing the behavior of liquid-crystal molecules in a fringe field area and a vertical field area immediately after electric field is applied to the flat LCD device shown in FIG. 12.
Figure 15:
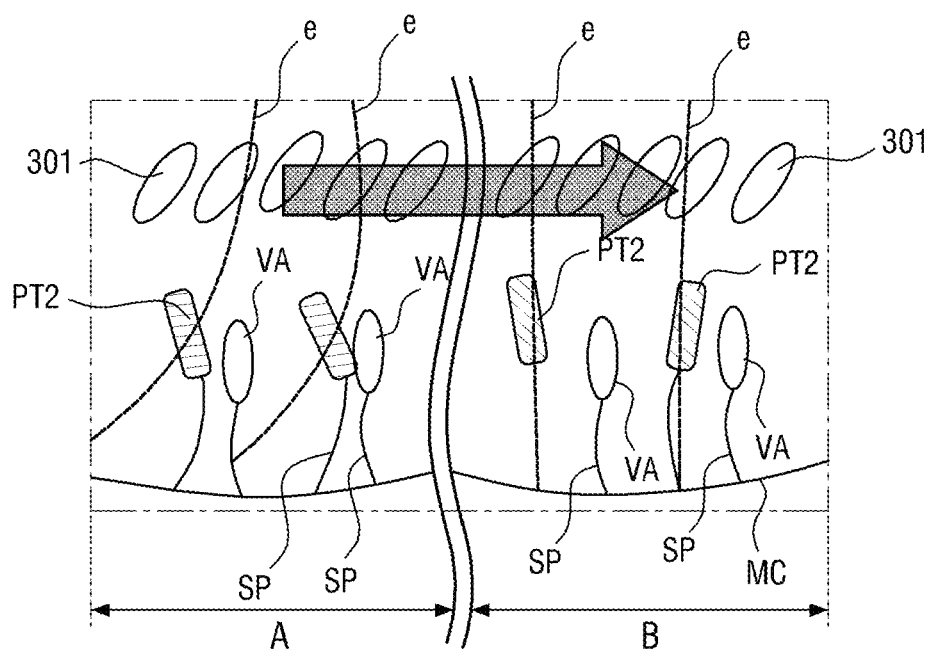
FIG. 15 is a view showing the behavior of liquid-crystal molecules in a fringe field area and a vertical field area in the final state after electric field is applied to the flat LCD device shown in FIG. 12.

FIG. 12 is a cross-sectional view of a flat LCD device 500-1 according to another exemplary embodiment in the initial state where no electric field is applied. FIG. 13A is an enlarged view of area X' of FIG. 12, and FIGS. 13B and 13C are enlarged views of areas Y' and Z' of FIG. 13A, respectively. FIG. 14 is a view showing the behavior of the negative liquid-crystal molecules 301 in fringe field area A and vertical field area B immediately after electric field is applied to the flat LCD device 500-1 shown in FIG. 12. FIG. 15 is a view showing the behavior of the negative liquid-crystal molecules 301 in fringe field area A and vertical field area B in the final state after electric field is applied to the flat LCD device 500-1 shown in FIG. 12.

Referring to FIGS. 12 and 13A, in the flat LCD device 500-1, the first liquid-crystal alignment layer 190' may include a second electric field sensitive polymer compound including a main chain MC, vertically-aligned side chains VA, and negative liquid-crystalline side chains PT2 having polar groups (refer to area Y' of FIGS. 13A and 13B). Herein, the first liquid-crystal alignment layer 190' may be defined as a second electric field sensitive liquid-crystal alignment layer.

Referring to FIGS. 2, 3A, 12 and 13A, the first liquid-crystal alignment layer 190' is different from the first liquid-crystal alignment layer 190 in that the first liquid-crystal alignment layer 190' may include the second electric field sensitive liquid-crystal alignment layer. The first liquid-crystal alignment layer 190 may be configured as the first electric field sensitive liquid-crystal alignment layer including positive liquid-crystalline side chains PT1.

Referring back to FIGS. 12 and 13A, the second liquid-crystal alignment layer 270' may be the second electric field sensitive liquid-crystal alignment layer. Referring to FIGS. 2, 3A, 12 and 13A, the second liquid-crystal alignment layer 270' is different from the second liquid-crystal alignment layer 270 in that the second liquid-crystal alignment layer 270' may include the second electric field sensitive liquid-crystal alignment layer. The second liquid-crystal alignment layer 270 may be configured as the first electric field sensitive liquid-crystal alignment layer including positive liquid-crystalline side chains PT1.

Although not shown in the drawings, the second liquid-crystal alignment layer 270' may include a vertically-aligned polymer compound that does not include the negative liquid-crystalline side chains PT2 and includes the main chain MC and the vertically-aligned side chains VA. In that case, the second liquid-crystal alignment layer 270' may be defined as a vertically-aligned liquid-crystal alignment layer. In an exemplary embodiment, the vertically-aligned polymer compound may be a polyimide-based polymer compound in which the main chain includes an imide group in a repeat unit and which is composed only of the vertically-aligned side chains, for example.

When electric field is applied to the flat LCD device 500-1, major axis of the negative liquid-crystalline side chains PT2 are aligned along the direction perpendicular to the electric field direction in the fringe field area A, and the dielectric constant of the minor axis is larger than that of the major axis. The negative liquid-crystalline side chains may electrostatically react with the liquid-crystal molecules 301, so that they may pretilt the liquid-crystal molecules 301 in the fringe field area A.

The negative liquid-crystalline side chains PT2 may include a mesogen structure for exhibiting liquid crystalline property, a polar group coupled with an end of the mesogen structure, and a flexible group coupled with the other end of the mesogen structure. In an exemplary embodiment, the mesogen structure may be a bicyclohexyl group, a cyclohexyl-phenyl group, a biphenyl group, a terphenly group, naphthalene, including at least two cyclic compounds, for example. In an exemplary embodiment, the polar group may be fluorine group (—F), for example. In an exemplary embodiment, the flexible group may be, for example, $C_{1-8}$ alkyl group or $C_{1-8}$ alkoxy group, for example.

In an exemplary embodiment, the negative liquid-crystalline side chains PT2 may be a compound expressed in Chemical Formula 3 below, for example:

upper portion U of the liquid-crystal alignment layer AL corresponding to approximately 90% of the thickness of the liquid-crystal alignment layer AL, the concentration of the electric field sensitive polymer compound may be larger than the concentration of the vertically-aligned polymer compound. At the middle portion M of the liquid-crystal alignment layer AL corresponding to approximately 50% of the thickness of the liquid-crystal alignment layer AL, the concentration of the electric field sensitive polymer compound may be substantially equal or similar to the concentration of the vertically-aligned polymer compound. At the lower portion L of the liquid-crystal alignment layer AL corresponding to approximately 20% of the thickness of the liquid-crystal alignment layer AL, the concentration of the vertically-aligned polymer compound may be larger than the concentration of the electric field sensitive polymer compound. Herein, the upper portion U may be defined as an area closer to the liquid-crystal layer 300, and the lower

[Chemical Formula 3]

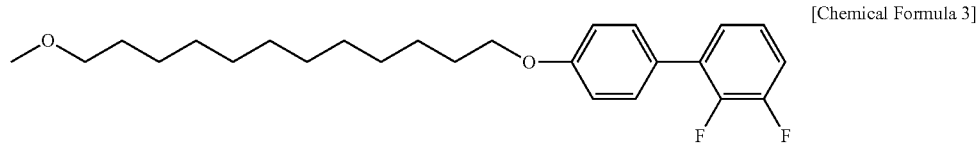 [SMILES: COCCCCCCCCCCCCOc1ccc(-c2cccc(F)c2F)cc1]

Referring to FIG. 14, immediately after electric field e is applied to the flat LCD device 500-1, in the fringe field area A, some of the negative liquid-crystal molecules 301 may electrostatically react with the negative liquid-crystalline side chains PT2 such that the major axis may be substantially perpendicular to the electric field e. In the vertical field area B where anchoring energy is weak, the negative liquid-crystal molecules 301 may be randomly oriented with no directivity.

Referring to FIG. 15, however, in the final state after the electric field e is applied to the LCD device 500-1, the directors of the negative liquid-crystal molecules 301 in the fringe field area A propagates quickly to the vertical field area B as indicated by the arrow, such that in both of the fringe field area A and the vertical field area B, the major axis of the negative liquid-crystal molecules 301 may be substantially perpendicular to the electric field e.

Figure 16:
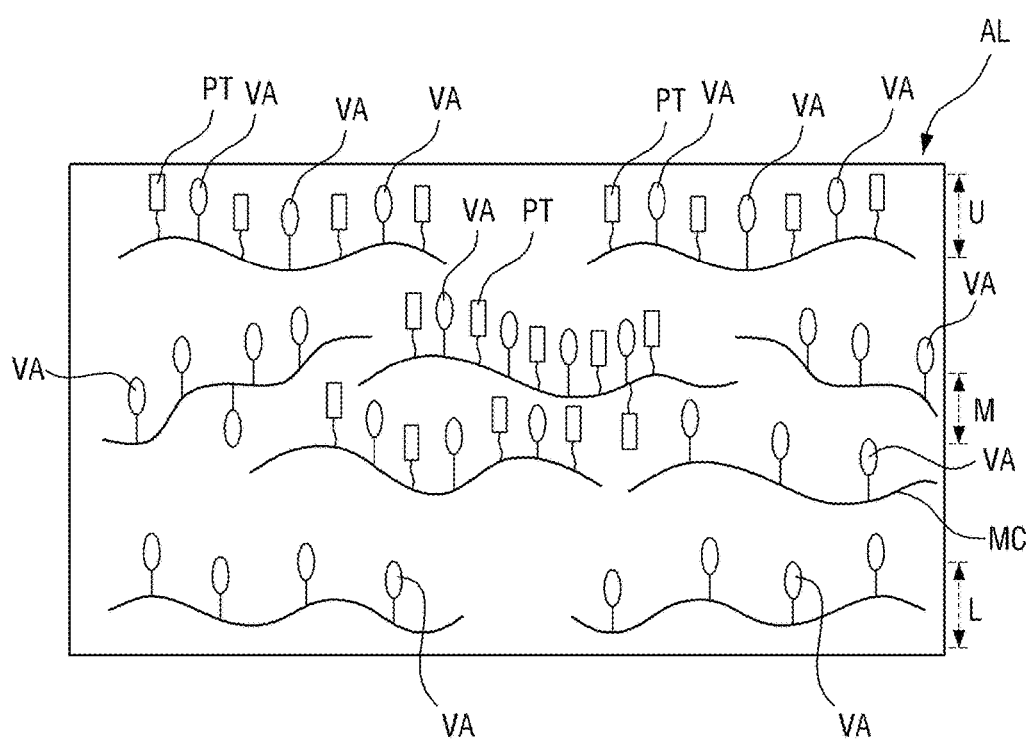
FIG. 16 is a view showing a liquid-crystal alignment layer including an electric field sensitive polymer compound and a vertically-aligned polymer compound.

FIG. 16 is a view showing a liquid-crystal alignment layer AL including one of the first electric field sensitive polymer compound and the second electric field sensitive polymer compound and the vertically-aligned polymer compound. Herein, the liquid-crystal alignment layer AL including the electric field sensitive polymer compound and the vertically-aligned polymer compound may be defined as a third electric field sensitive liquid-crystal alignment layer. In the liquid-crystal alignment layer AL, the electric field sensitive polymer compound and the vertically-aligned polymer compound are phase-separated, and the polar group has a concentration slope.

Referring to FIGS. 2 and 12, when the liquid-crystal alignment layers 190, 190', 270 and 270' of the flat LCD device 500 and 500-1 are configured as the liquid-crystal alignment layer AL, the liquid-crystal alignment layer AL may have a concentration slope of the polar group that is reduced as farther from the liquid-crystal layer 300 and closer to the electric field generating electrodes 180 and 250. Specifically, when the liquid-crystal alignment layers 190, 190', 270 and 270' of the flat LCD device 500 and 500-1 are configured as the liquid-crystal alignment layer AL, at the portion L may be defined as an area closer to the electric field generating electrodes 180 and 250.

Figure 17:
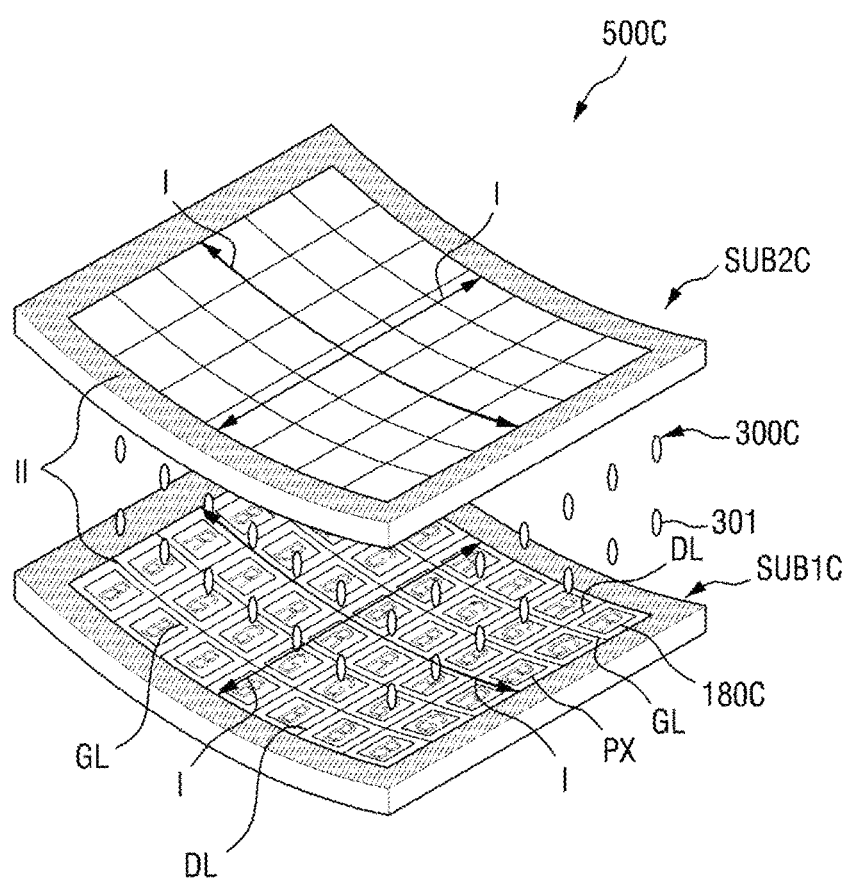
FIG. 17 is a perspective view of a curved LCD device according to a third exemplary embodiment of the invention.
Figure 18:
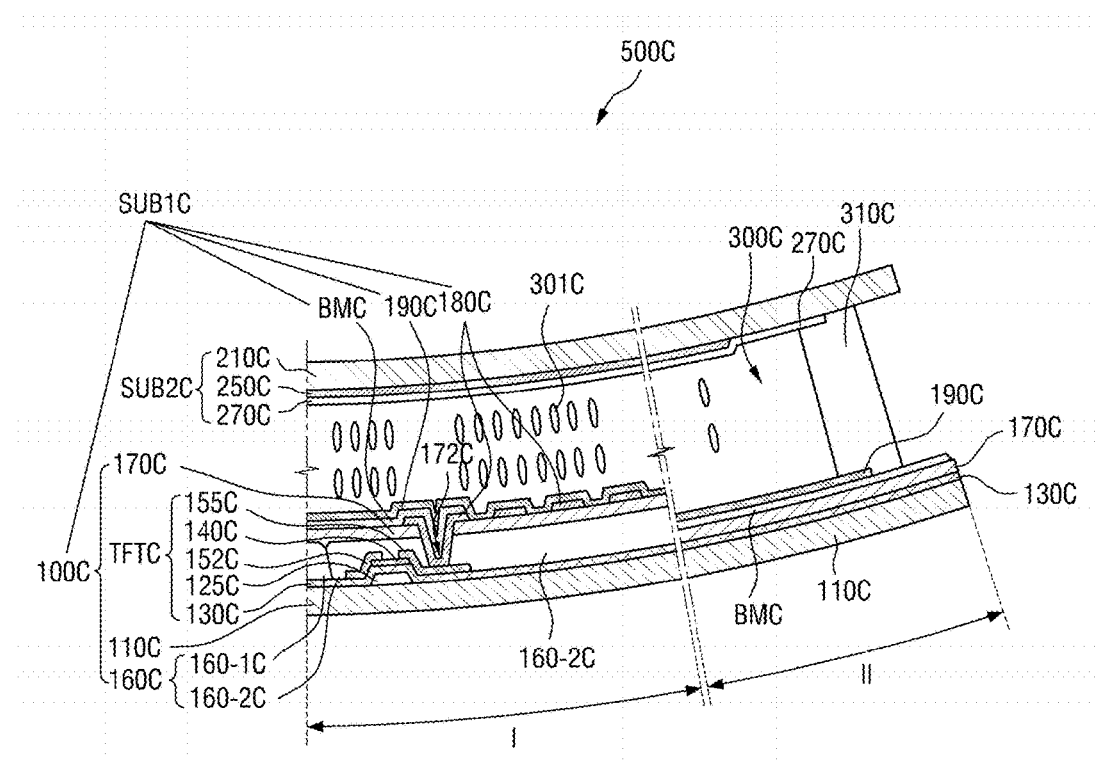
FIG. 18 is a cross-sectional view of the curved LCD device shown in FIG. 17 in the initial state where no electric field is applied.

FIG. 17 is a perspective view of a curved LCD device 500C according to a third exemplary embodiment of the invention. FIG. 18 is a cross-sectional view of the curved LCD device 500C shown in FIG. 17 in the initial state where no electric field is applied thereto.

The curved LCD device 500C may be fabricated by bending a flat LCD device. The curved LCD device 500C may include a curved display substrate SUB1C, an opposing curved display substrate SUB2C, and a liquid-crystal layer 300C interposed therebetween. The thin-film transistor array substrate 100C may include a curved substrate 110C, a thin-film transistor TFTC, a color filter layer 160C and an organic layer 170C. The pixel electrode 180C including a conductive material may be disposed on the organic layer 170C in every pixel PX. The light-blocking pattern layer BMC may be disposed on the thin-film transistor array substrate 100C and the pixel electrode 180C. The first liquid-crystal alignment layer 190C may be disposed on the light-blocking pattern layer BMC and the pixel electrode 180C.

The pixel electrode 180C is a pattern electrode having at least one of a protruding pattern and a slit pattern. In an exemplary embodiment, the pixel electrode 180C may be a pattern electrode in which the slit pattern is defined. The first liquid-crystal alignment layer 190C may be one of the first electric field sensitive liquid-crystal alignment layer, the second electric field sensitive liquid-crystal alignment layer, and the third electric field sensitive liquid-crystal alignment layer. The color filter layer 160C may include a first color filter 160-1C and a second color filter 160-2C. A light-blocking pattern layer BMC may be disposed between the color filter layer 160C and the first liquid-crystal alignment layer 190C and may overlap the thin-film transistor TFTC and the boundary between the first color filter 160-1C and the second color filter 160-2C.

The opposing curved display substrate SUB2C may include an opposing curved substrate 210C, a common electrode 250C disposed on the opposing curved display 210C, and a second liquid-crystal alignment layer 270C disposed on the common electrode 250C. The common electrode 250C may be a patternless electrode. The second liquid-crystal alignment layer 270C may be one of the first electric field sensitive liquid-crystal alignment layer, the second electric field sensitive liquid-crystal alignment layer, the third electric field sensitive liquid-crystal alignment layer, and the vertically-aligned liquid-crystal alignment layer. Considering a machine-hour input to forming films of the liquid-crystal alignment layer 190C and 270C, in terms of processing efficiency, the first liquid-crystal alignment layer 190C and the second liquid-crystal alignment line 270C may include the same material.

A surface of the curved LCD device 500C facing a viewer may be a concave surface. In an exemplary embodiment, the radius of curvature may range from about 2,000 millimeters (mm) to 5,000 mm, for example. The pretilt angle of the negative liquid-crystal molecules 301C at the top point of each of the curved display substrate SUB1C and the opposing curved display substrate SUB2C is substantially equal to the pretilt angle of the negative liquid-crystal molecules 301 with respect to the flat display substrate SUB1 and opposing flat display substrate SUB2 (refer to FIG. 2). Here, the top point refers to a point on a curve where the slope of the tangent line is substantially zero.

Figure 19:
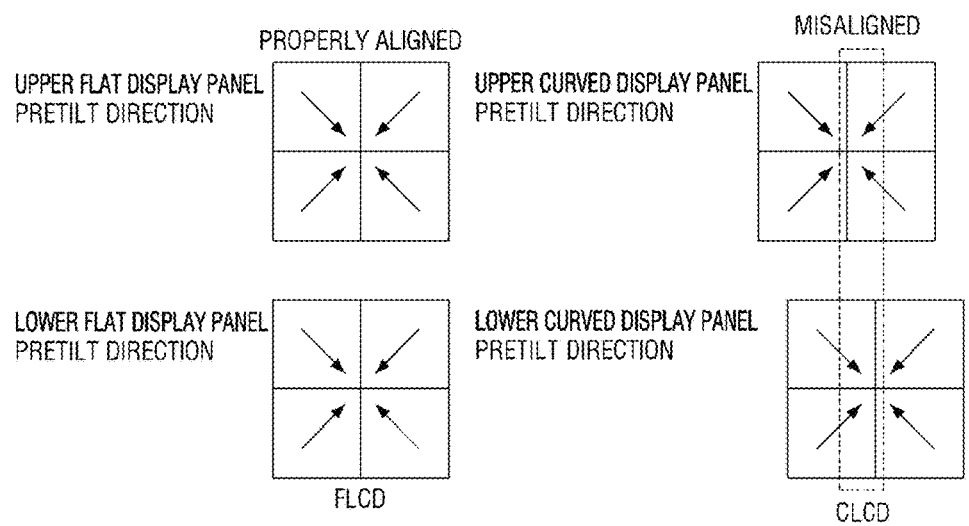
FIG. 19 shows a comparative example of an alignment state between the upper flat display substrate and the lower flat display substrate in the flat LCD device, and a comparative example of an alignment state between the upper curved display substrate and the lower curved display substrate in the curved LCD device fabricated by bending two ends of the flat LCD device.

FIG. 19 shows an alignment state between the upper flat display substrate and the lower flat display substrate in the flat LCD device FLCD according to the comparative example, and an alignment state between the upper curved display substrate and the lower curved display substrate in the curved LCD device CLCD fabricated from the flat LCD device FLCD according to the comparative example.

The flat LCD device FLCD according to the comparative example may be the patterned vertical alignment mode LCD device. During the process of bending the patterned vertical alignment mode LCD device, stress is exerted on the upper and lower flat display substrates, such that the upper flat display substrate may be shifted to the right or to the left relative to the lower flat display substrate, for example. As a result, misalignment may exist between the upper and lower curved display substrates of the curved LCD device CLCD.

Accordingly, when the curved LCD device CLCD is fabricated by bending the patterned vertical alignment mode LCD device, the layout between the upper curved display substrate and the lower curved display substrate may differ from the designed layout between the upper flat display substrate and the lower flat display substrate in the patterned vertical alignment mode LCD device.

The misalignment between the upper curved display substrate and the lower curved display substrate results in the misalignment (indicated by the dotted rectangular) at the boundary between the domains, and the misalignment at the boundary of the domains results in the interference or collision of the orientation of the liquid-crystal molecules having the negative dielectric anisotropy. Accordingly, the liquid-crystal molecules having the negative dielectric anisotropy located between the liquid-crystal molecules having the negative dielectric anisotropy oriented on the surface of the liquid-crystal alignment layer may be oriented substantially vertically. As a result, in the curved LCD device CLCD, texture may be perceived in the area indicated by the dotted rectangular as a spot or a dark portion, such that light transmittance of the curved LCD device CLCD may be lowered.

Referring back to FIG. 18, in the curved LCD device 500C, only the pixel electrode 180C is configured as a pattern electrode while the common electrode 250C is configured as a patternless electrode. Accordingly, the orientation of the negative liquid-crystal molecules 301C is controlled by using the pixel electrode 180C, and thus it is possible to prevent texture due to the misalignment between the curved display substrate SUB1C and the opposing curved display substrate SUB2C. As a result, the curved LCD device 500C may exhibit improved light transmittance over the curved LCD device CLCD fabricated from the flat LCD device FLCD according to the comparative example (refer to FIG. 19).

In addition, referring to FIG. 18, in the curved LCD device 500C, the first liquid-crystal alignment layer 190C includes one of the first electric field sensitive liquid-crystal alignment layer, the second electric field sensitive liquid-crystal alignment layer, and the third electric field sensitive liquid-crystal alignment layer. Accordingly, the curved LCD device 500C may exhibit improved response characteristics over the curved LCD display device CLCD according to the comparative example (refer to FIG. 19).

In addition, referring to FIG. 18, in the curved LCD device 500C, the curved display substrate SUB1C includes the color filter layer 160C, and thus it is possible to prevent color mixing due to the misalignment between the curved display substrate SUB1C and the opposing curved display substrate SUB2C. In addition, since the curved display substrate SUB1C includes the light-blocking pattern layer BMC, it is possible to prevent decrease in light transmittance due to the misalignment of the light-blocking pattern layer BMC resulted from the misalignment between the curved display substrate SUB1C and the opposing curved display substrate SUB2C. The gate electrode 125C, gate insulation film 130C, the semiconductor layer 140C, the source electrode 152C, the drain electrode 155C and the seal line seal line 310C may be substantially similar to the gate electrode 125, gate insulation film 130, the semiconductor layer 140, the source electrode 152, the drain electrode 155 and seal line 310 shown in FIG. 2, and thereby the detailed descriptions will be omitted.

It will be apparent to those skilled in the art that various modifications and variation may be made in the described embodiments. The described embodiments cover modifications and variations within the scope defined by the appended claims and their equivalents.

What is claimed is:

1. A liquid-crystal display device comprising:
a thin-film transistor array flat substrate;
an opposing flat substrate facing the thin-film transistor array flat substrate;
a liquid-crystal layer comprising liquid-crystal molecules having negative dielectric anisotropy, the liquid-crystal layer interposed between the thin-film transistor array flat substrate and the opposing flat substrate;
a pattern electrode disposed between the thin-film transistor array flat substrate and the liquid-crystal layer;
a first liquid-crystal alignment layer disposed between the pattern electrode and the liquid-crystal layer, the first liquid-crystal alignment layer including an electric field sensitive polymer compound including a main chain, vertically-aligned side chains, and liquid-crystalline side chains, the liquid-crystalline side chains comprising a mesogen unit comprising at least two cyclic compounds, a polar group coupled with an end of the mesogen unit, and a flexible group coupled with another end of the mesogen unit;

a patternless electrode disposed between the opposing flat substrate and the liquid-crystal layer;

and a second liquid-crystal alignment layer disposed between the patternless electrode and the liquid-crystal layer.

2. The liquid-crystal display device of claim 1, wherein the liquid-crystalline side chains are positive liquid-crystalline side chains having a dielectric constant of a major axis larger than a dielectric constant of a minor axis, and wherein the polar group includes at least one of fluorine group (—F) and cyano group (—CN).

3. The liquid-crystal display device of claim 1, wherein the liquid-crystalline side chains are negative liquid-crystalline side chains having a dielectric constant of a minor axis larger than a dielectric constant of a major axis, and wherein the polar group is fluorine group (—F).

4. The liquid-crystal display device of claim 1, wherein the second liquid-crystal alignment layer comprises the electric field sensitive polymer compound.

5. The liquid-crystal display device of claim 1, wherein the second liquid-crystal alignment layer includes a vertically-aligned polymer compound having a main chain and vertically-aligned side chains.

6. The liquid-crystal display device of claim 1, wherein a surface of the liquid-crystal display device facing a viewer is a concave surface.

7. The liquid-crystal display device of claim 1, wherein the thin-film transistor array flat substrate comprises a base substrate, a thin-film transistor disposed on the base substrate, and a color filter layer disposed on the thin-film transistor.

8. The liquid-crystal display device of claim 7, wherein the color filter layer comprises a first color filter and a second color filter, and the liquid-crystal display device further comprises:

a light-blocking pattern layer disposed between the first liquid-crystal alignment layer and the color filter layer and overlapping the thin-film transistor and a boundary between the first color filter and the second color filter.

9. The liquid-crystal display device of claim 8, wherein a surface of the liquid-crystal display device facing a viewer is a caved surface.

10. The liquid-crystal display device of claim 1, wherein the first liquid-crystal alignment layer further comprises a vertically-aligned polymer compound, wherein a concentration of the polar group has a concentration slope which decreases as farther from the liquid-crystal layer and closer to the pattern electrode.

11. The liquid-crystal display device of claim 4, wherein the second liquid-crystal alignment layer further comprises a vertically-aligned polymer compound, wherein a concentration of the polar group has a concentration slope which decreases as farther from the liquid-crystal layer and closer to the patternless electrode.

\* \* \* \* \*